United States Patent
Pogue

(10) Patent No.: US 7,909,153 B2
(45) Date of Patent: Mar. 22, 2011

(54) EXTENDIBLE CONVEYOR SYSTEM

(76) Inventor: Richard W. Pogue, St. Peters, MO (US)

( * ) Notice: Subject to any disclaimer, the term of this patent is extended or adjusted under 35 U.S.C. 154(b) by 55 days.

(21) Appl. No.: 12/474,106

(22) Filed: May 28, 2009

(65) Prior Publication Data
US 2009/0294246 A1    Dec. 3, 2009

Related U.S. Application Data

(63) Continuation-in-part of application No. 10/870,892, filed on Jun. 18, 2004, now abandoned.

(51) Int. Cl.
- *B65G 21/10* (2006.01)
- *B65G 13/00* (2006.01)
- *B65G 15/60* (2006.01)

(52) U.S. Cl. .............. 198/315; 198/312; 198/316.1; 198/539; 198/812

(58) Field of Classification Search .......... 198/312, 198/315, 316.1, 539, 812; 193/35 TE
See application file for complete search history.

(56) References Cited

U.S. PATENT DOCUMENTS

| | | | |
|---|---|---|---|
| 2,870,922 A * | 1/1959 | Thomson | 414/792 |
| 3,651,963 A * | 3/1972 | McWilliams | 414/789.8 |
| 3,717,263 A * | 2/1973 | McWilliams | 414/789.8 |
| 3,788,444 A | 1/1974 | McWilliams | |
| RE29,110 E | 1/1977 | Oury | |
| 4,058,198 A | 11/1977 | ONeill | |
| 4,946,027 A | 8/1990 | Jenkins | |
| 5,176,485 A | 1/1993 | Ruder | |
| 5,203,442 A * | 4/1993 | Oury et al. | 198/313 |
| 5,299,906 A | 4/1994 | Stone | |
| 5,685,416 A | 11/1997 | Bonnet | |
| 5,718,325 A * | 2/1998 | Doster et al. | 198/592 |
| 6,305,327 B1 * | 10/2001 | Bounds, Jr. | 119/713 |
| 6,845,859 B2 * | 1/2005 | Grundl | 198/314 |
| 7,108,125 B2 * | 9/2006 | Gilmore et al. | 198/812 |
| 7,168,555 B2 * | 1/2007 | Peterson | 198/812 |
| 7,347,418 B2 * | 3/2008 | Speller | 271/264 |
| 7,370,753 B2 * | 5/2008 | Yang et al. | 198/812 |
| 7,641,043 B2 * | 1/2010 | Vestergaard | 198/592 |

* cited by examiner

*Primary Examiner* — Douglas A Hess
(74) *Attorney, Agent, or Firm* — Charles McCloskey

(57) ABSTRACT

A conveyor system includes an extension section that slides inwardly and telescopes outwardly of a main section of conveyor. The extension motion is powered by at least one hydraulic ram. The conveyor has a stem that lowers to a loadable height by the retraction of double hydraulic rams upon a steel internal core. The conveyor then lifts vertically in a cantilevered manner upon a vertical ram and then rotates 360 degrees parallel to the plane of a truck bed using a cooperating gear plate and a hydraulic motor with a chain. Paddles push material secured to a chain drive or alternately a belt and the chain drive or belt moves through a series of sprockets or rollers in a continuous manner. The paddles eventually return to their initial location.

6 Claims, 5 Drawing Sheets

EXTENDIBLE CONVEYOR SYSTEM

CROSS-REFERENCE TO RELATED APPLICATION

This non-provisional application is a continuation in part of the non-provisional application for patent having the Ser. No. 10/870,892, filed on Jun. 18, 2004, now abandoned and which is owned by the same inventor.

BACKGROUND OF THE INVENTION

The extendible conveyor system generally relates to material handling equipment, and more specifically to a conveyor on an extendible boom that transports material from a low level, such as a truck bed, along an incline conveyor onto a high level plane, such as a rooftop.

DESCRIPTION OF THE PRIOR ART

Over the years, various conveying systems have appeared to aid the loading and unloading of cargo from transportation vehicles to destinations. The U.S. Pat. No. 4,058,198 to O'Neill et al. shows a conveyor assembly with an extension built on to it. O'Neill employs two separate conveyors: a main conveyor and a secondary conveyor mounted pivotally at the forward end. O'Neill also has an in use position and an out of use position where the out of use position has the boom conveyor locating under part of the main conveyor. On the other hand, the present invention operates as a conveyor that extends, retracts, and elevates upon a pivot post. The present invention remains in a usable position as it telescopes with one endless conveyor.

The U.S. Pat. No. 5,685,416 to Bonnet provides a conveyor assembly with an extendible boom. This patent though employs tubular steel, telescopic members requiring roller assemblies mounted upon the outside of the extendible boom. This patent then has a control circuit adapted to coordinate the extension of the telescoping boom with the movement of a first roller assembly with respect to a second roller assembly. However, the present invention uses four sections of steel C-channel that contain the roller assembly within them. The present invention also does not require coordination between roller assemblies because it has a conveyor with all sections continuously active, whether retracted, in process of extending, or fully extended.

The U.S. Pat. No. RE29,110 to Oury also illustrates a boom mounted conveying means where a load supporting cantilever boom contains a fixed section and a moving section mounted on a support column. Oury uses two separate conveyors with the secondary conveyor being mounted underneath the main conveyor. The present invention though has a single, continuous, in-line conveyor.

The U.S. Pat. No. 5,176,485 to Ruder et al. provides a freight manipulator with a cantilevered boom. The manipulator has a conveyor with a rear base section 14, a middle lift section 15, and a front head section 16. These sections then connect to a rear pitch frame 18 in an inclined relationship akin to a ramp. Various hydraulic struts raise the sections for manual transfer of freight. On the other hand, the present invention has one section extending axially from another section of conveyor and the entire conveyor raising vertically and rotating upon two axes not shown in Ruder.

The U.S. Pat. No. 3,788,444 to McWilliams shows a steering control for mobile conveyors. Though this patent shows a retractable frame, the frame of the conveyor does not cantilever from a stem.

The U.S. Pat. No. 4,946,027 to Jenkins describes a boom conveyor. This conveyor cantilevers from one end vertically upon a scissors lift life feature. However, this conveyor does not rotates upon its cantilevered end as in the present invention.

And the U.S. Pat. No. 5,299,906 to Stone shows a pneumatic load elevator. The elevator uses a scissors like lifting arrangement where the load is stabilized by two air bags. The present invention though does not use scissor lifts and does not use airbags in its construction.

The present invention overcomes the disadvantages of the prior art and provides an extendible conveyor with a single belt where the conveyor elevates at a desired angle and pivots about a desired rotational angle upon a pivot. The present invention also employs a dual hydraulic ram stem, similar to a column, that lowers the base end of the conveyor to ease loading of material, such as roofing shingles upon the conveyor from a nearby truck bed. The external dual rams also allow for an increased load and accessible maintenance. The present invention's stem also contains a one-piece steel core that begins at the base end of the conveyor and travels downward through the truck bed. The steel core then terminates at a certain distance below and underneath a truck bed or other vehicle carrying the invention thus, supporting the weight of the conveyor. The present invention extends its length via hydraulics which greatly increases its reach thus the conveyor carries material further distances. Operators of the invention may feed the material continuously at selected rate.

SUMMARY OF THE INVENTION

The present invention is a device that transports material from a low plane, such as the bed of a truck or other vehicle, along an inclined conveyor and onto a high plane, such as a rooftop. The device telescopically extends its length via hydraulics to carry material further distances at selected angles. Operators can feed material continuously upon the conveyor of the invention. The device also has dual rams along the stem that raise and lower the main section for easier loading of material onto the conveyor near the end of the truck bed or other flat vehicle part.

There has thus been outlined, rather broadly, the more important features of the invention in order that the detailed description thereof that follows may be better understood and that the present contribution to the art may be better appreciated. The present invention also includes chain drive and belt drive to telescope the conveyor, a hydraulic motor 54 which is driven by a drive chain 56 in FIG. 3, a conveyor stem 52 of a one piece steel core 44 upon a core support plate 46 also in FIG. 3, and related equipment.

Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved extendible conveyor system.

Another object is to provide such an extendible conveyor system that extends its length telescopically using a continuous belt.

Another object is to provide such an extendible conveyor system that changes its angle relative to the horizontal thus transporting material between two elevated locations.

Another object is to provide such an extendible conveyor system that has a low cost of manufacturing so the purchasing organizations can readily buy the extendible conveyor system through supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present invention overcomes the prior art limitations by providing a conveyor of two sections where one section telescopes from the other and the conveyor pivots while attaining various angles. The conveyor has a base secured to a transport vehicle, usually a truck, and a free end or tip opposite the base that delivers material.

Figure 1A:
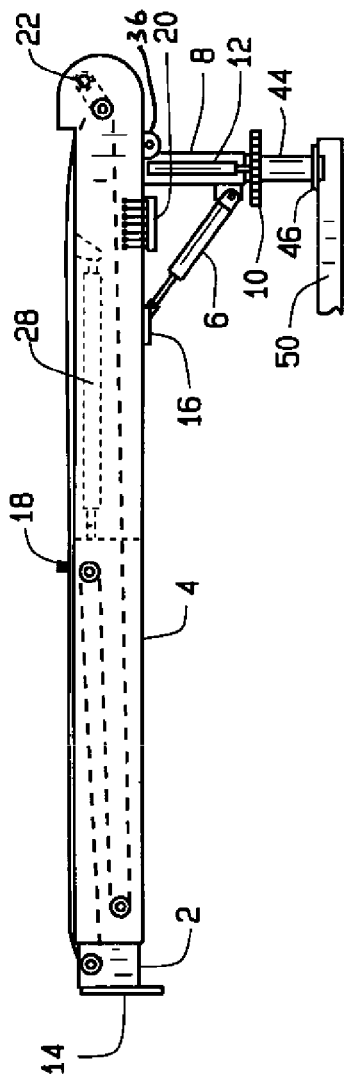
FIG. 1A is a side view of the invention when retracted with the belt shown in phantom.

FIG. 1A shows the invention from the side when an extension 2 attains a retracted position within a main section 4 of the conveyor. The extension has an end support 14, generally planar, welded to the end of the extension generally defining the tip or free end of the conveyor. The end support abuts the edge of a roof or rests upon a roof as needed by the operator. This figure shows a conveyor that moves materials placed thereon using a chain drive. The chain drive operates using a continuous flexible member such as chain 26 travelling over sprockets 24, shown in phantom. The chains travel upon their shown path driven by a hydraulic power transfer assembly 22 operated by controls 20 as shown. The hydraulic power transfer assembly is located upon the main conveyor opposite the end support. Alternatively, the invention has a pair of continuous chains, one upon each side of the conveyor. The extension 2 connects to a hydraulic ram 28 located upon the interior of the conveyor and shown retracted in this figure. Additionally, the chain includes paddles as at 18 upon which rest material during usage, particularly with the conveyor at an angle as in FIG. 7.

Beneath the hydraulic power transfer assembly, the invention has a conveyor stem 8, here shown retracted with its internal core 44 nesting inside. The conveyor stem extends and retracts using a pair of hydraulic rams as at 12 and later shown in FIGS. 3, 4. The conveyor stem has a nearby gear plate 10 joined to the internal core 44 below the stem in its retracted position. The gear plate is generally perpendicular to the stem and parallel to the plane of a truck bed. The core continues downwardly to a core support plate 46 generally of greater width than the core. The core support plate is generally parallel to the gear plate and the core support plate is welded to the transport vehicle, particularly a truck, frame as at 50. The core 44 rests upon the plate 46 so that the core can rotate about its longitudinal axis. Alternatively, the plate includes bearings to ease rotation of the core.

A vertical ram 6 extends from a support 16 upon the main section 4 to the conveyor stem 8 generally opposite the main section. The vertical ram 6 pivotally connects to the support and the stem and attains a generally forty five degree angle between the support and the stem when the invention is lowered to a horizontal position. The ram lengthens and elevates the main section 4 as later shown in FIG. 7.

Figure 1B:
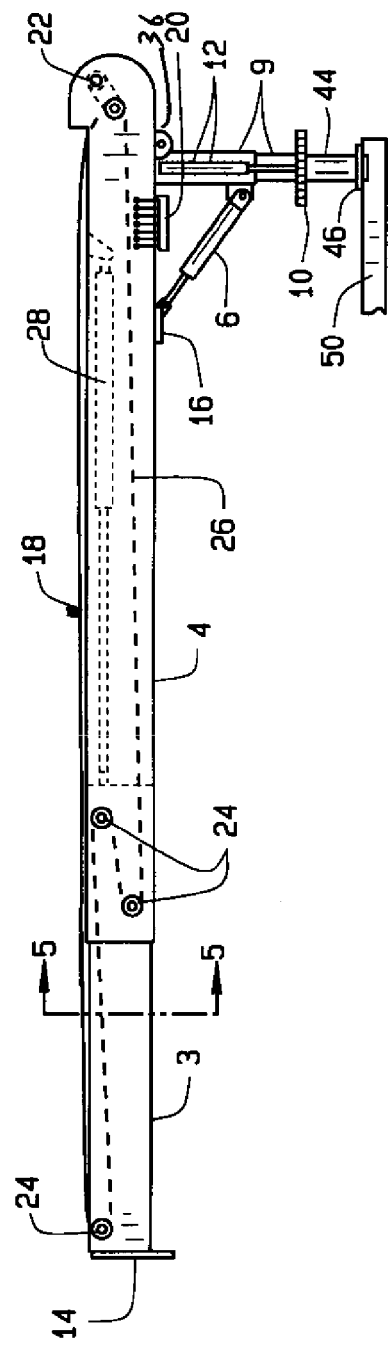
FIG. 1B shows another side view of the invention when extended with the belt shown in phantom.

Then FIG. 1B shows the invention fully extended, as at 3, from the side while using a chain drive 26. The invention extends when the ram 28 extends outwardly from its retracted position previously shown in FIG. 1A. The chain drive 26 travels upon a plurality of sprockets 24 as shown under power from the hydraulic power transfer assembly 22. Generally, the extension section 2 has a sprocket 24 locating just inside of the end support 14 and a second sprocket 24 locating proximate the connection of the ram 28 to the extension section 2. The main section has a sprocket 24 generally opposite the hydraulic power transfer assembly 22. In this figure, the sprockets of the main section and the extension section proximate the ram appear to have moved closer in comparison to FIG. 1A thus the sprockets maintain tension upon the chain. This figure also shows the conveyor stem 8 extended upwardly upon its internal core 44 as shown at 9.

Figure 2A:
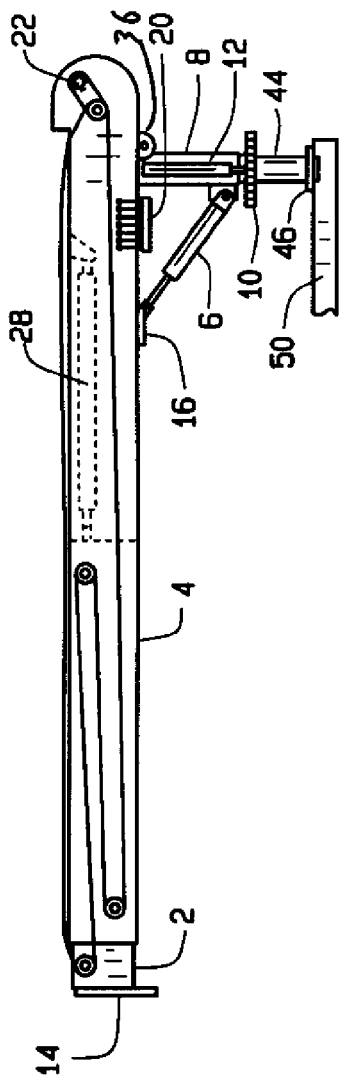
FIG. 2A is a side view of the retracted invention showing the path of the belt.

Similar to FIG. 1A, FIG. 2A illustrates a side view of an alternate embodiment of the invention when retracted, though a belt 26a moves material placed thereon, as a substitute for the chain drive.

Figure 2B:
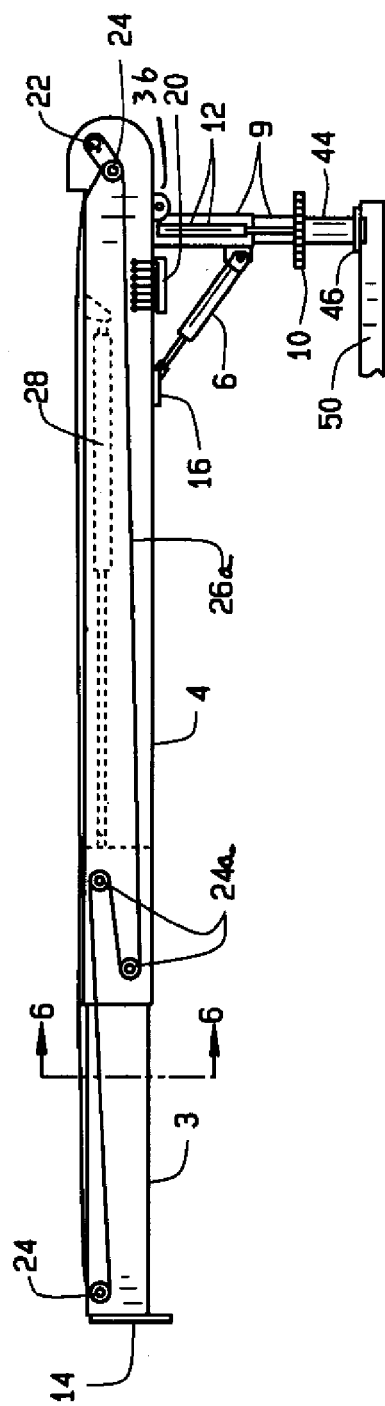
FIG. 2B is another side view of the extended invention showing the path of the belt.

Also similar to FIG. 1B, FIG. 2B shows the alternate embodiment of the invention using a belt drive where the extension section 2 telescopes, as at 3, outwardly and axially from the main section 4. Similar to the sprockets before, rollers 24a of the extension 2 and the main section 4 cooperate so that the belt maintains tension at any point during the telescoping and lengthening of the invention.

Figure 3:
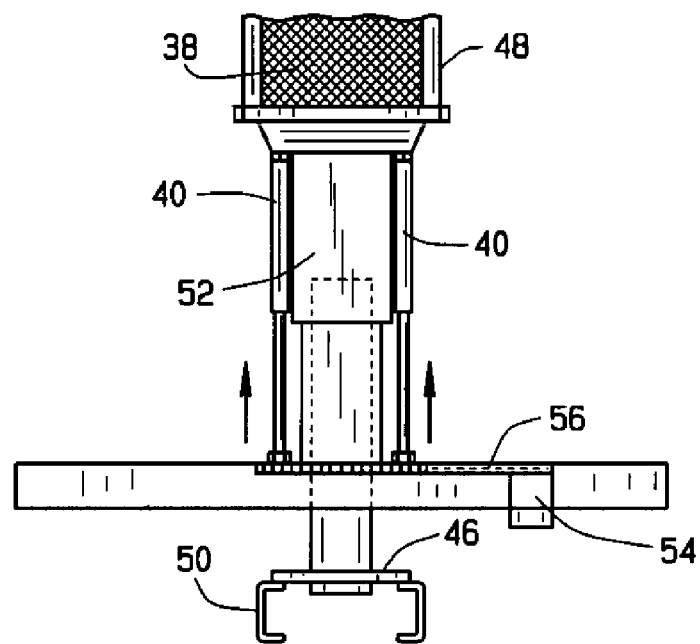
FIG. 3 describes a rear view of the invention with rams extended.

Generally away from the cab of a transport vehicle, FIG. 3 describes a rear view of the invention with rams 12 fully extended as at 40. The main section 4 generally ends as at 48 in a mesh housing 38 that prevents intrusion of animals or errant operators into the main section 4. The main section end 48 joins to the conveyor stem 8 and particularly to its outer portion as at 52. The outer portion is generally hollow and has an inside shape slightly larger than the shape of the internal core. Preferably, the internal core 44 is steel and round in cross section thus matching a preferred round outer portion 52. The rams extend outwardly to their full length as at 40 against the gear plate 10. The gear plate 10 has a pattern of teeth upon its perimeter that engage a drive chain 56 powered by its own hydraulic motor 54. The motor secures to the bed of the transport vehicle as at 42 and the gear plate rotates generally in the plane of the transport vehicle's bed. As before, the internal core 44 extends through the bed 42 to the core support plate 46 that joins to the frame members 50 of the transport vehicle, particularly C channels of a truck frame. The invention moves up and down upon the core while the core rotates upon the gear plate thus the invention can be adjusted vertically and in rotation relative to the centerline of the transport vehicle.

Figure 4:
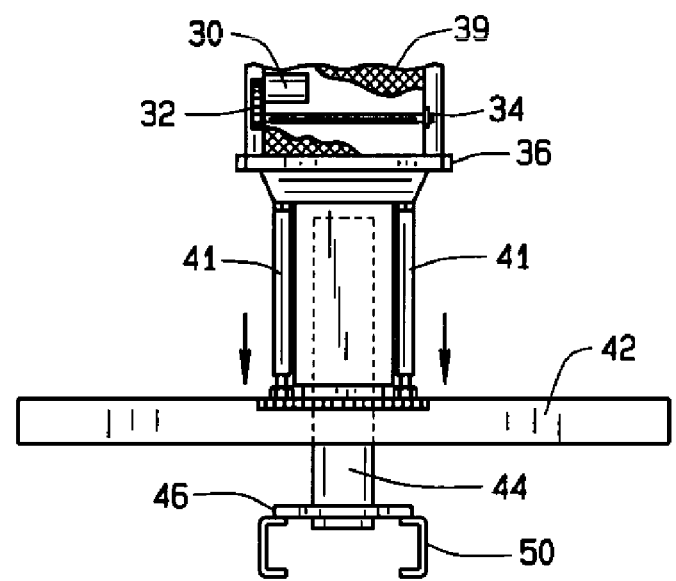
FIG. 4 describes another rear view of the invention with the rams retracted.

Then FIG. 4 describes another rear view of the invention with the rams 12 retracted as at 41 and the mesh end 38 partially exposed as at 39. In retracting, the rams bring the end 48 of the main section 4 downward. The outer portion 52 of the conveyor stem 8 slides upon the core 44 towards the transport vehicle bed 42 and to the gear plate 10. This end 48 of the main section includes the hydraulic power transfer assembly 22 having a hydraulic motor 30, drive chain 32, and a drive axle 34 that move the chain 36 which drive the preferred embodiment of the invention. The hydraulic motor 30, drive chain 32, and a drive axle 34 also cooperate to turn the drive rollers of the alternate belt conveyor as previously described. This figure also provides a conveyor pivot axle 36 that connects to the main section 4. The axle 36 allows the main section to elevate, that is, rotate about an axis parallel to the bed 42 or, that is, up and down relative to the cab of the transport vehicle.

Figure 5:
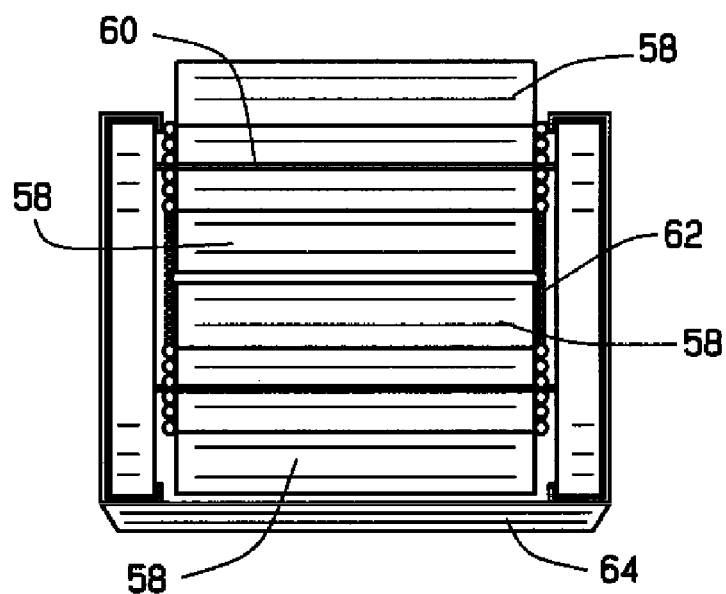
FIG. 5 illustrates a front view of the invention using a chain and sprocket drive.

FIG. 5 shows a section through the extension section 2 looking towards the main section 4. This figure utilizes the preferred embodiment with a chain and sprocket drive. As previously shown, the invention utilizes sprockets 24 to maintain continuous drive at various lengths. Each sprocket includes an axle 60 that extends to a counter part sprocket 24 upon the opposite side of the conveyor. The sprockets each engage a section 62 of chain 26. As before the chain includes paddles shown above the conveyor as 18 previously and shown here within the conveyor as 58. The paddles have a height that avoids their colliding inside the conveyor when they return to the hydraulic transfer assembly 22. The sides of the extension section 2 are secured using cross members shown at 64.

Figure 6:
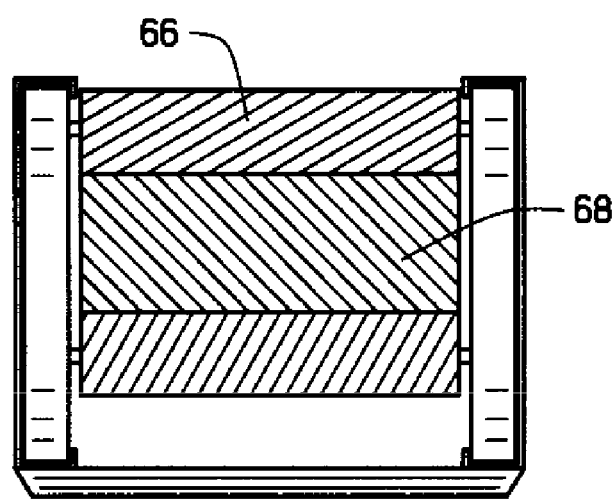
FIG. 6 then shows another front view of the invention using a belt and roller drive; and, FIG. 7 describes the present invention extended and at an angle ready to move material upwardly.

FIG. 6 then shows another section view similar to FIG. 5 that uses a belt and roller drive, the alternate embodiment of the invention. The rollers have ends as at 24a shown in FIG. 2B. From the ends, the rollers continue as cylinders 66 with light knurling thereon to engage the belt 26a shown transitioning between cylinders as at 68. As the belt is continuous and spans the width of the conveyor, no paddles are provided in the belt embodiment.

Figure 7:
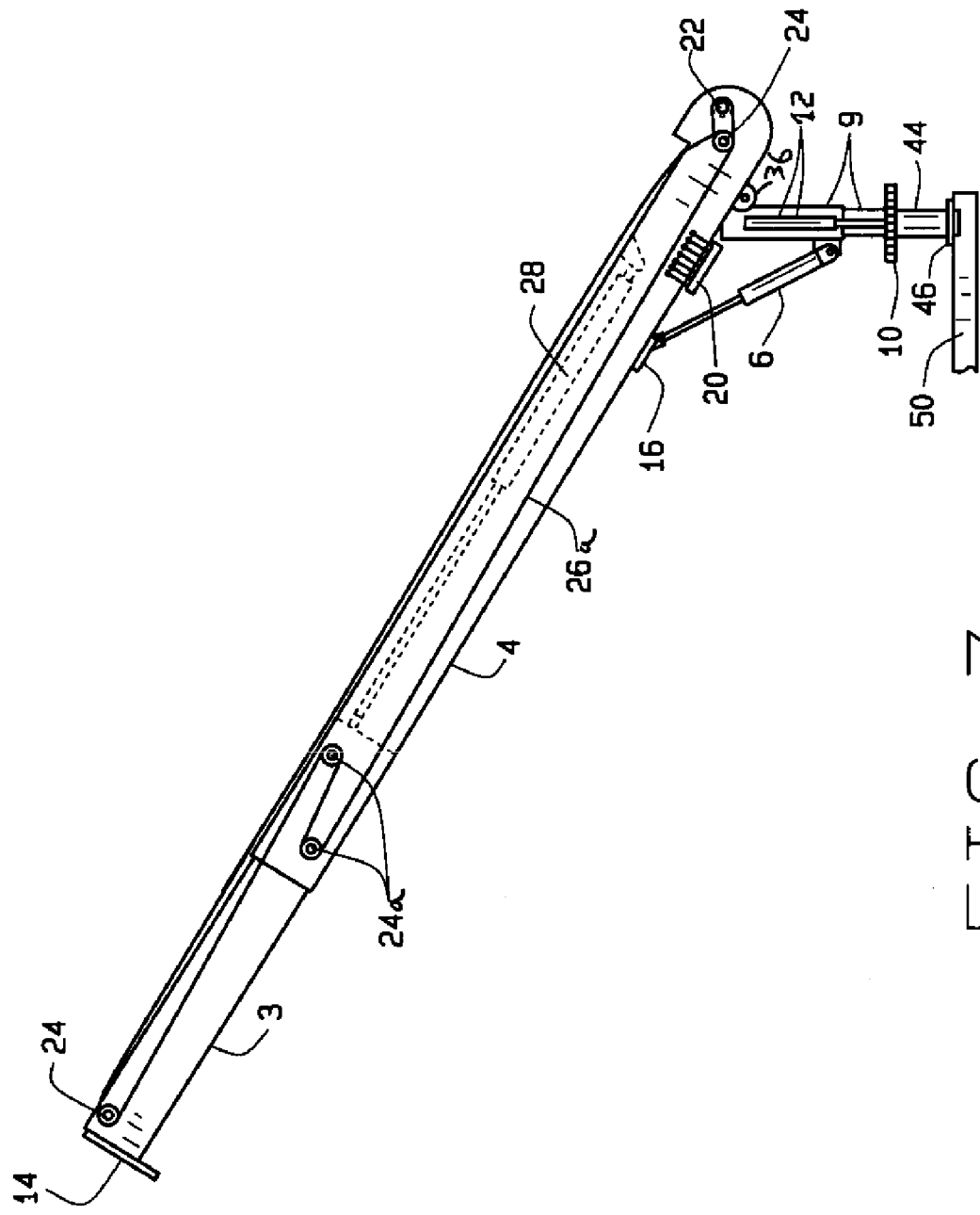

And, FIG. 7 shows the present invention ready to deliver material from a truck's 50 bed 42 to an upper plane or level such as a roof. Here the present invention has the extension section 2 telescoped outwardly from the main section 4 and the main section rotated upwardly upon the axle 36 as the vertical ram 6 extends. For more vertical height, the rams 12 can be extended to raise the main section and thus the extension section a little higher as needed. Though a belt 26a and rollers 24a are shown for belt drive, a chain, sprocket, and paddle system may be substituted in this figure.

The conveyor of the present invention includes an extension section 2 having its end support 14. The extension section has the ability to slide inwardly and telescope outwardly of the main section of conveyor at 4. The sliding and telescoping motion is powered by at least one hydraulic ram 28 as in FIG. 1. The conveyor stem 52 lowers to a loadable height by the retraction of double hydraulic rams 41 upon a steel internal core 44 as shown in FIGS. 3, 4. The conveyor of the invention lifts vertically in a cantilevered manner upon a vertical ram 6 and then rotates 360 degrees parallel to the plane of the truck bed 42 using a cooperating gear plate 10 and a hydraulic motor 54 with chain 56 in FIGS. 3, 4. In the preferred embodiment, paddles 18 push material secured to a chain drive 26 or alternately a belt 26a and the chain drive or belt moves through a series of sprockets 24 or rollers 24a. The paddles eventually return to their initial locations as the chain drive or belt rotate continuously as shown. And, in a further alternate embodiment, the chain drive or belt has an internal position entirely within the conveyor and lacks external sections or elbows.

Variations or modifications to the subject matter of this disclosure may occur to those skilled in the art upon reviewing the summary as provided herein, in addition to the description of its preferred embodiments. Such variations or modifications, if within the spirit of this development, are intended to be encompassed within the scope of the invention as described herein. The description of the preferred embodiment as provided, and as show in the drawings, is set forth for illustrative purposes only.

From the aforementioned description, an extendible conveyor system for lifting material upon an inclined telescoping conveyor from a truck bed to a roof has been described. The extendible conveyor system is uniquely capable of lengthening a conveyor, rotating the conveyor in the plane of a truck bed, and raising the conveyor as a cantilever above the cab of a truck. The extendible conveyor system and its various components may be manufactured from many materials, including, but not limited to singly or in combination, polymers, polyester, polyethylene, polypropylene, polyvinyl chloride, nylon, steel, ferrous and non-ferrous metals and their alloys, and composites.

I claim:

1. An extendible conveyor system, for a transport vehicle such as a truck having a bed, delivering material from one level to another higher level, comprising:
    at least one conveyor having a main section and an extension section axially nesting within said main section, said extension section having an end opposite said main section, said extension section telescoping in and out of said main section;
    means for providing power to said at least one conveyor for telescoping movement of said extension section from said main section;
    a continuous flexible member travelling upon and through said main section and said extension section, said continuous flexible member being driven by one of chain drive or rollers;
    a conveyor stem connecting to said main section in a cantilever manner, said conveyor stem including an outer portion and an internal core, said outer portion having an axle for pivotal connection to said main section, said internal core extending axially from said outer portion;
    two hydraulic rams providing power for vertical movement of said outer portion relative to said internal core;
    at least one gear plate securing to said internal core and one of a hydraulic motor or a chain driven motor providing power to said at least one gear plate, wherein said at least one gear plate and one of a hydraulic motor or chain drive motor cooperate to rotate said internal core through 360 degrees; and,
    wherein said system is adapted to rotate about the plane of the truck bed, is adapted to raise above the plane of the truck bed, and is adapted to lengthen axially to deliver material from the truck bed to a higher level.

2. The conveyor system according to claim 1 wherein said extension section telescopes outwardly and retracts inwardly from said main section by an internally positioned hydraulic ram.

3. The conveyor system according to claim 1 wherein said continuous flexible member is a pair of chains having a plurality of paddles spaced there across, said paddles pushing material placed upon said chains, and said paddles passing within said extension section and said main section.

4. The conveyor system according to claim 1 wherein said continuous flexible member is a belt having a plurality of paddles spaced thereon, said paddles pushing material placed upon said belt, and said paddles passing within said extension section and said main section.

5. The conveyor system according to claim 1 further comprising:
   a plurality of controls operating said flexible member, telescoping of said extension member, rotation of said main section upon said conveyor stem, and elevation of said outer portion upon said internal core;
   wherein said controls lower said outer portion to a loadable height relative to the truck bed and raise said outer portion vertically once loading upon said flexible member has completed;
   wherein said controls rotate said main section to a suitable angle relative to said conveyor stem towards the elevation of the higher level;
   wherein said controls lengthen said system such that said extension section telescopes outwardly from said main section at the angle of said main section to reach the higher level; and,
   wherein said controls move said flexible member thus delivering material loaded thereon to the higher level.

6. An extendible conveyor system, for a transport vehicle such as a truck having a bed, delivering material from one level to another higher level, comprising:
   at least one conveyor having a main section and an extension section axially nesting within said main section, said extension section having an end opposite said main section, said extension section telescoping in and out of said main section by an internally positioned hydraulic ram;
   a pair of chains spaced apart in mutually parallel planes, having a plurality of paddles spaced there across, said paddles pushing material placed upon said chains, and said pair of chains and said paddles passing within and upon said extension section and said main section;
   a conveyor stem connecting to said main section in a cantilever manner, said conveyor stem including an outer portion and an internal core, said outer portion having an axle for pivotal connection to said main section, said internal core extending axially from said outer portion;
   means for providing power to said at least one conveyor for sliding and telescoping movement of said extension section from said main section;
   two hydraulic rams moving said providing power for vertical movement of said outer portion relative to said internal core of said conveyor stem;
   at least one gear plate securing to said internal core and one of a hydraulic motor or a chain driven motor providing power to said at least one gear plate, wherein said at least one gear plate and one of a hydraulic motor or chain drive motor cooperate to rotate said internal core through 360 degrees;
   a plurality of controls operating said pair of chains, telescoping of said extension member, rotation of said main section upon said conveyor stem, and elevation of said outer portion upon said internal core;
   wherein said controls lower said outer portion to a loadable height relative to the truck bed and raise said outer portion vertically once loading upon said flexible member has completed;
   wherein said controls rotate said main section to a suitable angle relative to said conveyor stem towards the elevation of the higher level;
   wherein said controls lengthen said system such that said extension section telescopes outwardly from said main section at the angle of said main section to reach the higher level;
   wherein said controls move said pair of chains thus delivering material loaded thereon to the higher level; and,
   wherein said system is adapted to rotate about the plane of the truck bed, is adapted to raise above the plane of the truck bed, and is adapted to lengthen axially to deliver material from the truck bed to a higher level.

* * * * *